US011091192B2

(12) United States Patent
McMickell et al.

(10) Patent No.: US 11,091,192 B2
(45) Date of Patent: Aug. 17, 2021

(54) INTEGRATED VEHICLE GUIDANCE AND STEERING SYSTEM

(71) Applicant: AgJunction LLC, Scottsdale, AZ (US)

(72) Inventors: Michael Brett McMickell, Scottsdale, AZ (US); Mark Alan Villela, Glendale, AZ (US); Thomas R. Kreider, Peoria, AZ (US); Jonathan L. Baker, Chandler, AZ (US); Andreas F. Ramm, Woolloongabba (AU)

(73) Assignee: AGJUNCTION LLC, Scottsdale, AZ (US)

(*) Notice: Subject to any disclaimer, the term of this patent is extended or adjusted under 35 U.S.C. 154(b) by 95 days.

(21) Appl. No.: 16/775,036

(22) Filed: Jan. 28, 2020

(65) Prior Publication Data

US 2021/0031830 A1  Feb. 4, 2021

Related U.S. Application Data

(60) Provisional application No. 62/881,209, filed on Jul. 31, 2019.

(51) Int. Cl.
*B62D 11/00* (2006.01)
*B62D 5/04* (2006.01)
(Continued)

(52) U.S. Cl.
CPC ........... *B62D 5/0409* (2013.01); *B60W 50/08* (2013.01); *B62D 5/0406* (2013.01); *B62D 5/046* (2013.01);
(Continued)

(58) Field of Classification Search
CPC .... B62D 5/0409; B62D 5/0406; B62D 5/046; B62D 15/025; B62D 11/00; B62D 5/04;
(Continued)

(56) References Cited

U.S. PATENT DOCUMENTS 3,003,363 A  10/1961  DeHart
4,681,055 A   7/1987  Cyr
(Continued)

FOREIGN PATENT DOCUMENTS

| CN | 203812091 U | 9/2014 |
| EP | 1787889 A1 | 5/2007 |
| WO | 1995015499 A1 | 6/1995 |

OTHER PUBLICATIONS

European Patent Office; International Search Report and Written Opinion; PCT App. No. PCT/US2020/015484; pp. 1-15.
(Continued)

*Primary Examiner* — Shardul D Patel
(74) *Attorney, Agent, or Firm* — Schwabe Williamson & Wyatt

(57) ABSTRACT

Cost of a precision farming guidance system is driven in part by the number of discrete system elements installed in a tractor including the steering actuator, guidance computer, user terminals, and the associated cable harnesses. An integrated guidance system arranges and integrates these separate elements into a base chassis and removable computer module to reduce cost and complexity while retaining flexibility to adapt to different vehicle configurations and to incorporate improved guidance computer technology into a common design platform.

17 Claims, 17 Drawing Sheets

(51) Int. Cl.
*G06F 9/451* (2018.01)
*B60W 50/08* (2020.01)
*B62D 15/02* (2006.01)
*G05D 1/02* (2020.01)

(52) U.S. Cl.
CPC ........... *B62D 15/025* (2013.01); *G05D 1/021* (2013.01); *G06F 9/451* (2018.02); *B60W 2510/20* (2013.01)

(58) Field of Classification Search
CPC ... G06F 9/451; B60W 50/08; B60W 2510/20; G05D 1/021; Y02A 40/10; A01B 69/008
USPC ............................................. 701/41; 180/444
See application file for complete search history.

(56) References Cited

U.S. PATENT DOCUMENTS

| | | |
|---|---|---|
| 5,194,851 A | 3/1993 | Kraning et al. |
| 5,390,125 A | 2/1995 | Sennott et al. |
| 5,615,581 A | 4/1997 | Cordioli |
| 5,663,879 A | 9/1997 | Trovato et al. |
| 5,923,270 A | 7/1999 | Sampo et al. |
| 6,052,647 A | 4/2000 | Parkinson et al. |
| 6,070,673 A | 6/2000 | Wendte |
| 6,212,453 B1 | 4/2001 | Kawagoe et al. |
| 6,373,432 B1 | 4/2002 | Rabinowitz et al. |
| 6,377,889 B1 | 4/2002 | Soest |
| 6,445,983 B1 | 9/2002 | Dickson et al. |
| 6,539,303 B2 | 3/2003 | McClure et al. |
| 6,711,501 B2 | 3/2004 | McClure et al. |
| 6,789,014 B1 | 9/2004 | Rekow et al. |
| 6,819,780 B2 | 11/2004 | Benson et al. |
| 6,865,465 B2 | 3/2005 | McClure |
| 6,876,920 B1 | 4/2005 | Mailer |
| 7,142,956 B2 | 11/2006 | Heiniger et al. |
| 7,162,348 B2 | 1/2007 | McClure et al. |
| 7,277,792 B2 | 10/2007 | Overschie |
| 7,373,231 B2 | 5/2008 | McClure et al. |
| 7,400,956 B1 | 7/2008 | Feller et al. |
| 7,431,325 B2 | 10/2008 | Stahle |
| 7,437,230 B2 | 10/2008 | McClure |
| 7,460,942 B2 | 12/2008 | Mailer |
| 7,628,239 B1 | 12/2009 | Louie |
| 7,648,004 B1* | 1/2010 | Larouche ................. B62D 5/04 180/443 |
| 7,689,354 B2 | 3/2010 | Heiniger et al. |
| RE41,358 E | 5/2010 | Heiniger et al. |
| 7,835,832 B2 | 11/2010 | Macdonald et al. |
| 7,885,745 B2 | 2/2011 | McClure et al. |
| 8,018,376 B2 | 9/2011 | McClure et al. |
| 8,190,337 B2 | 5/2012 | McClure |
| 8,214,111 B2 | 7/2012 | Heiniger et al. |
| 8,311,696 B2 | 11/2012 | Reeve |
| 8,386,129 B2 | 2/2013 | Collins et al. |
| 8,401,704 B2 | 3/2013 | Pollock et al. |
| 8,489,291 B2 | 7/2013 | Dearborn et al. |
| 8,521,372 B2 | 8/2013 | Hunt et al. |
| 8,548,649 B2 | 10/2013 | Guyette et al. |
| 8,583,315 B2 | 11/2013 | Whitehead et al. |
| 8,583,326 B2 | 11/2013 | Collins et al. |
| 8,589,013 B2 | 11/2013 | Pieper et al. |
| 8,594,879 B2 | 11/2013 | Roberge et al. |
| 8,634,993 B2 | 1/2014 | McClure et al. |
| 8,639,416 B2 | 1/2014 | Jones et al. |
| 8,649,930 B2 | 2/2014 | Reeve et al. |
| 8,676,620 B2 | 3/2014 | Hunt et al. |
| 8,718,874 B2 | 5/2014 | McClure et al. |
| 8,768,558 B2 | 7/2014 | Reeve et al. |
| 8,781,685 B2 | 7/2014 | McClure |
| 8,803,735 B2 | 8/2014 | McClure |
| 8,897,973 B2 | 11/2014 | Hunt et al. |
| 8,924,152 B2 | 12/2014 | Hunt et al. |
| 9,002,565 B2 | 4/2015 | Jones et al. |
| 9,002,566 B2 | 4/2015 | McClure et al. |
| 9,141,111 B2 | 9/2015 | Webber et al. |
| 9,162,703 B2 | 10/2015 | Miller et al. |
| 9,164,508 B1* | 10/2015 | Takach, Jr. ............. G05D 1/021 |
| 9,173,337 B2 | 11/2015 | Guyette et al. |
| 9,223,314 B2 | 12/2015 | McClure et al. |
| 9,255,992 B2 | 2/2016 | McClure |
| 9,389,615 B2 | 7/2016 | Webber et al. |
| 9,996,081 B2 | 6/2018 | Owens |
| 10,384,709 B2 | 8/2019 | Joughin |
| 10,822,017 B2 | 11/2020 | Tan et al. |
| 2002/0072850 A1 | 6/2002 | McClure et al. |
| 2004/0186644 A1 | 9/2004 | McClure et al. |
| 2006/0079372 A1* | 4/2006 | Ringger ................. B62D 1/046 477/79 |
| 2006/0149446 A1 | 7/2006 | Nelson |
| 2006/0167600 A1 | 7/2006 | Nelson, Jr. et al. |
| 2007/0118263 A1* | 5/2007 | Nelson ................. A01B 69/008 701/41 |
| 2010/0274452 A1 | 10/2010 | Ringwald et al. |
| 2014/0266877 A1 | 9/2014 | McClure |
| 2014/0277676 A1 | 9/2014 | Gattis |
| 2015/0175194 A1 | 6/2015 | Gattis |
| 2015/0251688 A1* | 9/2015 | Mayer .................... B62D 15/00 180/402 |
| 2016/0039454 A1* | 2/2016 | Mortimer ............. B62D 5/0415 701/41 |
| 2016/0154108 A1 | 6/2016 | McClure et al. |
| 2016/0205864 A1 | 7/2016 | Gattis et al. |
| 2016/0214643 A1* | 7/2016 | Joughin ............... G05D 1/0278 |
| 2016/0252909 A1 | 9/2016 | Webber et al. |
| 2016/0334804 A1 | 11/2016 | Webber et al. |
| 2018/0105200 A1 | 4/2018 | Joughin |
| 2018/0148085 A1* | 5/2018 | Tan .......................... B62D 1/00 |
| 2018/0201299 A1 | 7/2018 | Ashtari |
| 2019/0300052 A1* | 10/2019 | Allan .................. B62D 15/0245 |

OTHER PUBLICATIONS

International Search Report and Written Opinion; PCT/US2017/056770; dated Feb. 2, 2018.
"The evolution of portable valve actuators", https://www.linkedin.com/pulse/evolution-portable-valve-actuators-tim-hughes, Jul. 5, 2017, pp. 1-5.
"ATEX Certified Pneumatic Portable Valve Actuator", https://www.totallockout.com/expertise/valve-assist/pneumatic/pneumatic-windygun/, Nov. 2, 2017, pp. 1-7.
International Preliminary Report on Patentability; PCT/US2017/056770; dated May 2, 2019.
International Search Report and Written Opinion; PCT/US2018/015003 dated Jan. 24, 2018; 12 pages.
International Preliminary Report on Patentability; PCT/US2018/015003 dated Aug. 8, 2019; 8 pages.
Noh, Kwang-Mo, Self-tuning controller for farm tractor guidance, Iowa State University Retrospective Theses and Dissertations, Paper 9874, (1990).
Van Zuydam,. R.P., Centimeter-Precision Guidance of Agricultural Implements in the Open Field by Means of Real Tim Kinematic DGPS, ASA-CSSA-SSSA, pp. 1023-1034 (1999).

* cited by examiner

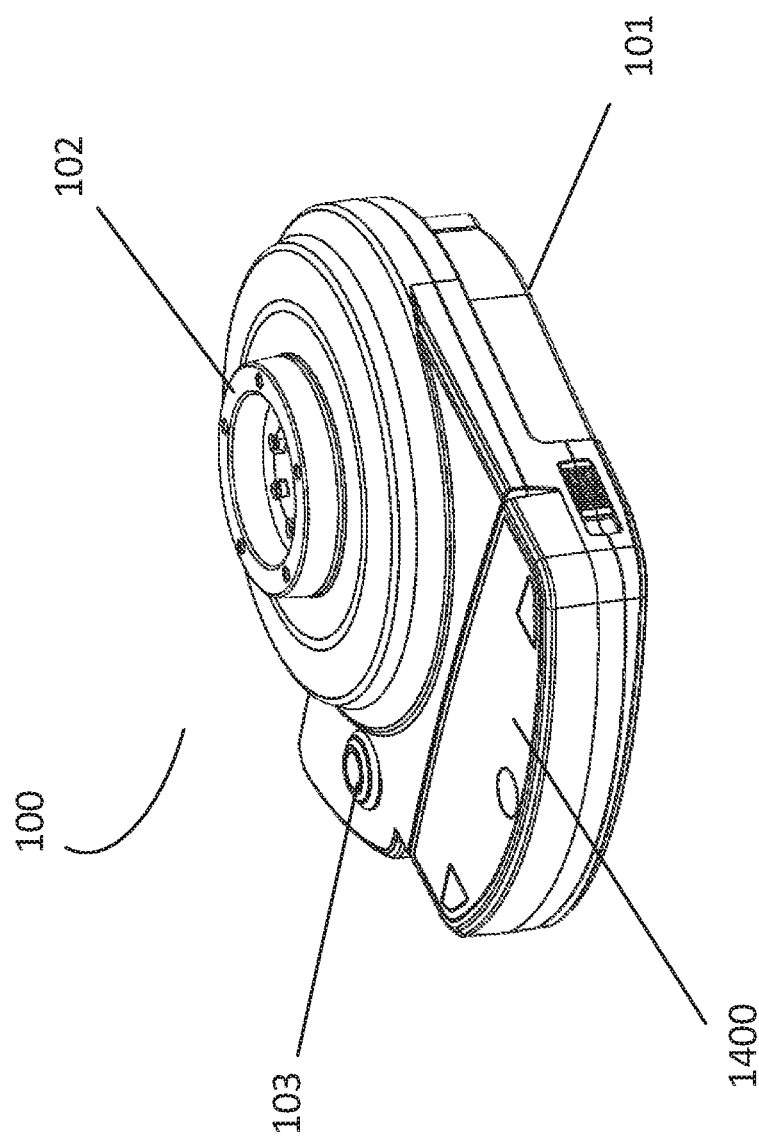

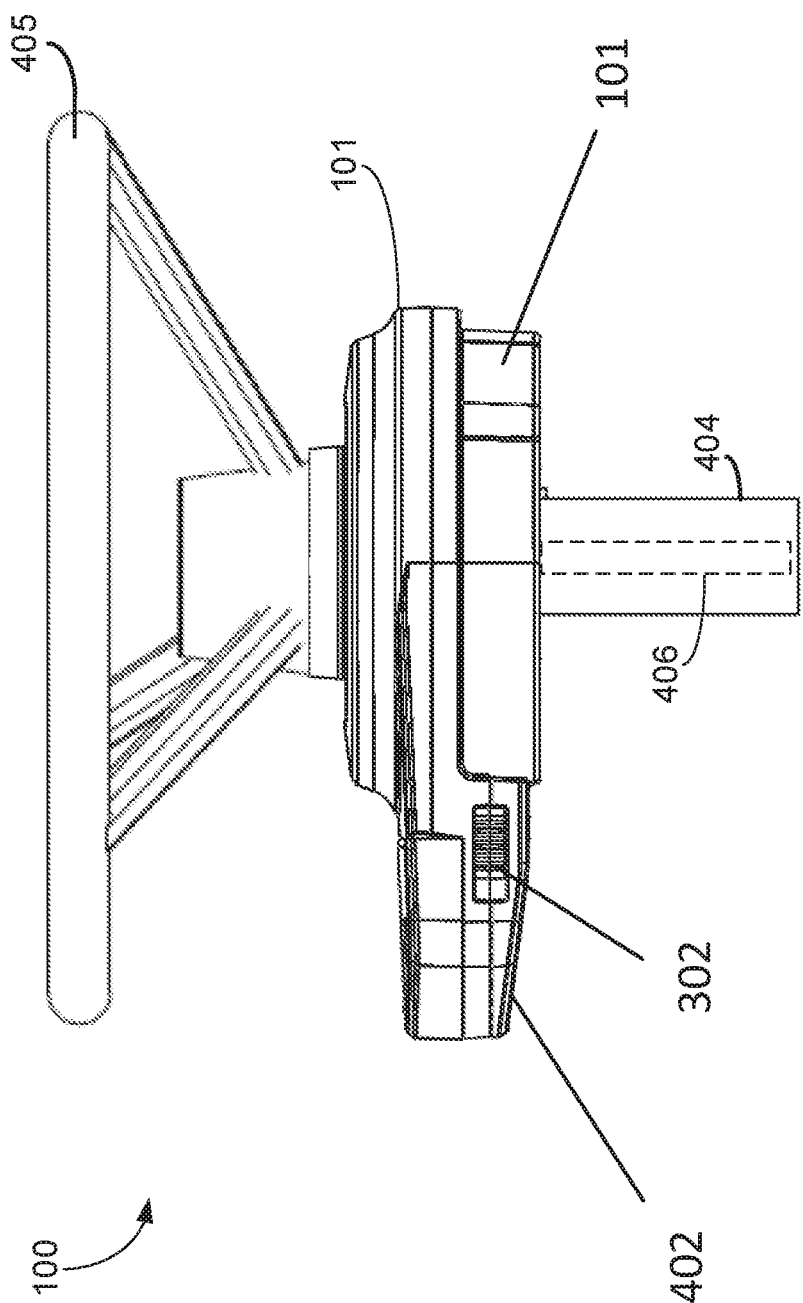

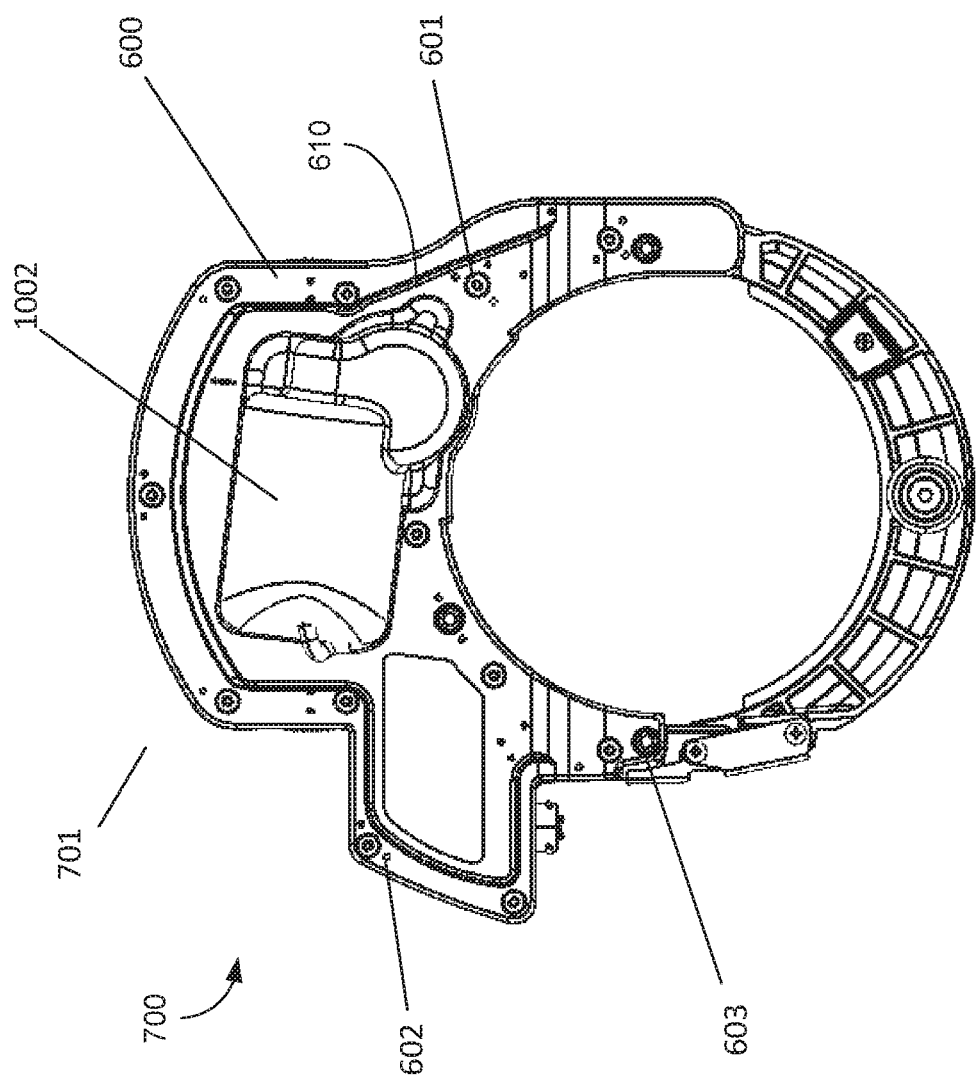

INTEGRATED VEHICLE GUIDANCE AND STEERING SYSTEM

PRIORITY

This application is a non-provisional of and claims priority benefit to U.S. Provisional Application No. 62/881,209 filed on Jul. 31, 2019, which is herein incorporated by reference in its entirety

BACKGROUND

The cost of a precision farming guidance system is relatively high in part due to the number of discrete elements in the guidance system, such as floor mounted computers, steering actuators, and user terminals. The different chassis used in a farming guidance system also increases the costs for additional boxes, connectors, power supplies, manufacturing processes, etc. These different discrete elements and chassis also increase system installation time. The disclosure that follows solves this and other problems.

SUMMARY

A precision agriculture guidance system contains highly integrated mechanical packaging. A steering actuator, guidance computer, inertial measurement unit, user interface, and wireless connectivity are integrated into one device. The guidance system uses a modular approach to integration that simplifies upgradability and reduces cost. The guidance system is also water and contaminate resistant.

Additional aspects and advantages will be apparent from the following detailed description of preferred embodiments, which proceeds with reference to the accompanying drawings.

BRIEF DESCRIPTION OF THE DRAWINGS

FIG. 1 shows a highly integrated tractor guidance and steering system that includes an electro-mechanical actuator, guidance computer, and interfaces to a vehicle.

FIG. 4B shows the integrated guidance system attached to a steering wheel and steering wheel mounting post.

FIG. 12 shows features of the bottom of the second chassis design including a water seal boundary, water drainage feature of the seal, and an anti-rotation pin.

DETAILED DESCRIPTION OF PREFERRED EMBODIMENTS

FIG. 1 shows an integrated tractor guidance and steering system (guidance system) 100 that includes a base chassis 101 that houses a power switch 103. Base chassis 101 is alternatively referred to as an enclosure. Base chassis 101 houses a motor with a mechanical interface 102 that attaches at a bottom end to a vehicle steering column and a steering shaft located within the steering column. A steering wheel attaches to the top end of mechanical interface 102 (see FIG. 4B). A removable guidance computer module 1400 with optional buttons and indicator lights attaches to base chassis 101.

Examples of how mechanical interface 102 attaches to a steering column and examples of the different electrical components that may be housed inside of base chassis 101 are described in co-pending U.S. application Ser. No. 15/878,849, entitled: INTEGRATED AUTO-STEER SYSTEM FOR VEHICLE, filed on Jan. 24, 2018; and U.S. Pat. No. 10,384,709, entitled: ACTUATOR FOR TURNING A STEERING WHEEL IN AUTOMATIC STEERING SYSTEMS, filed Oct. 16, 2017 which are both herein incorporated by reference in its entirety.

Figure 2A:
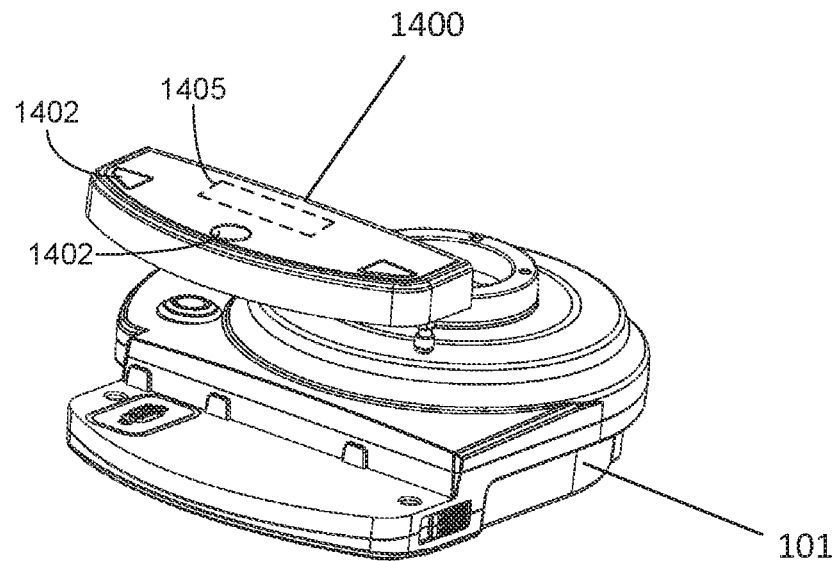
FIGS. 2A and 2B show the modular nature of the integrated guidance system including a removable guidance computer of two different configurations including an optional user interface.

FIG. 2A shows the modular nature of integrated guidance system 100. Removable computer module 1400 can be configured for different vehicle guidance operations through an internal guidance computer 1405 (shown in dashed lines) and user interfaces, such as indicator lights and/or buttons 1402.

Figure 2B:
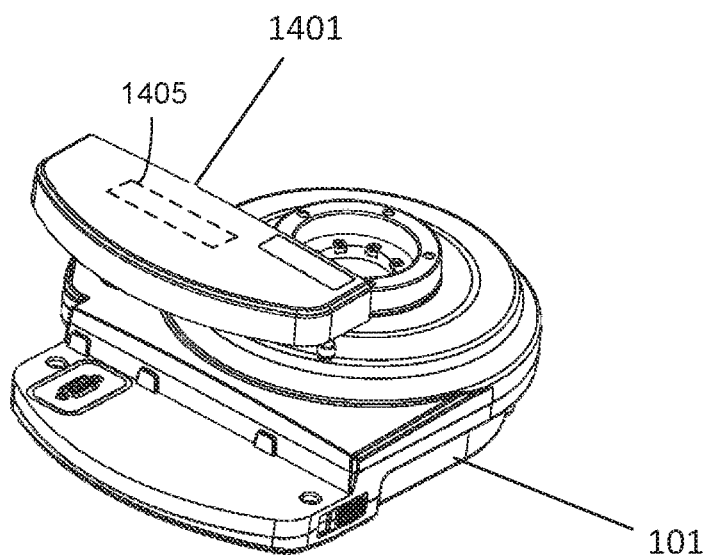

FIG. 2B shows an example removable computer module 1401 with no user interfaces. In one example, the top cover of computer module 1401 is empty and guidance and other user interface functions are implemented from other external interfaces on other parts of the vehicle installation. Computer modules 1400 and 1401 are generally interchangeable.

Accordingly, any reference to computer module 1400 or 1401 below also may refer to the other one of computer modules 1400 and 1401.

Figure 3:
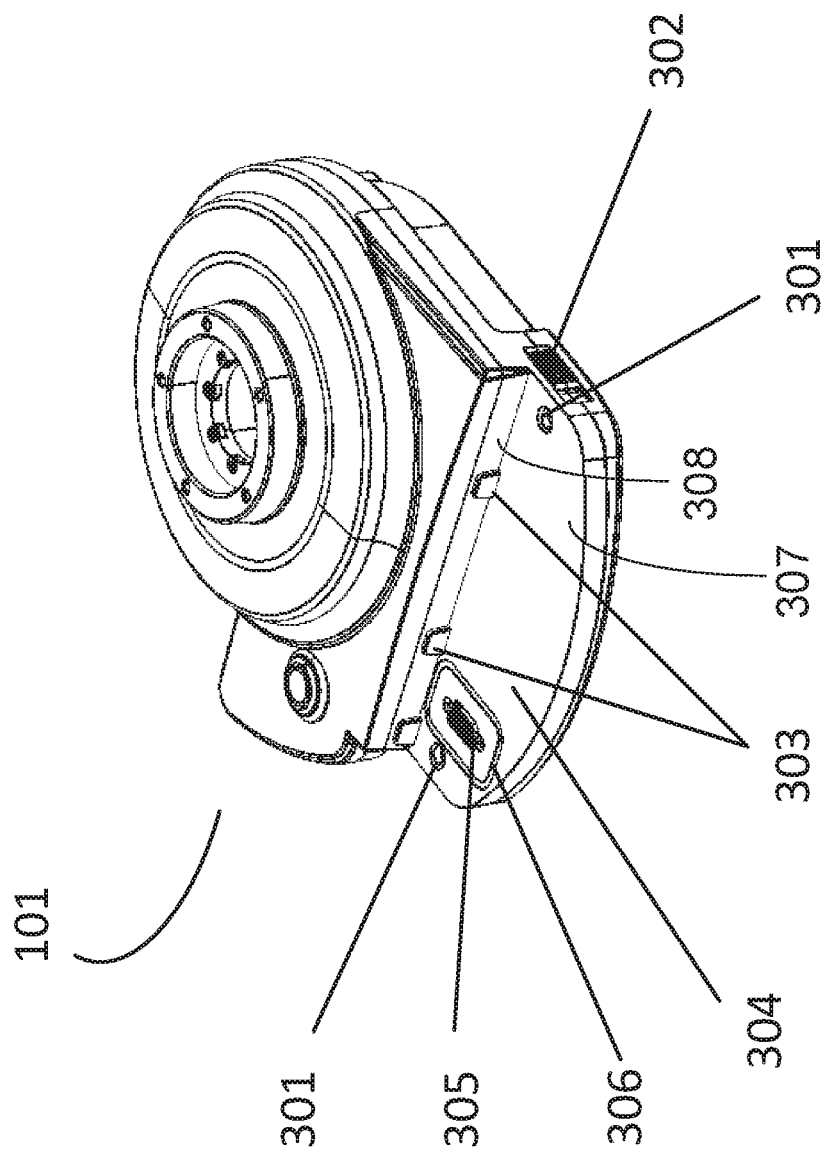
FIG. 3 shows a chassis of the integrated guidance system and features thereof which enable a modular guidance computer, with or without an optional user interface, to be attached to the chassis.

FIG. 3 shows in more detail the interfaces between base chassis 101 and removable computer module 1400 and 1401 in FIGS. 2A and 2B, respectively. The interfaces allow removable computer module 1400 to be attached to multiple different designs of base chassis 101. This modularity provides a number of advantages including easier assembly, test, user installation, repair, and future upgrades.

A pocket or shelf 304 is formed in the front end of base chassis 101 to receive and attach to removable computer module 1400. Shelf 304 is alternatively referred to as a docking platform. Shelf 304 incorporates several features to locate, retain, and communicate with computer module 1400. Shelf 304 includes a side wall 308 that extends vertically down from a top surface of base chassis 101. A floor 307 extends horizontally out from the bottom end of side wall 308 to the front end of chassis 101. Floor 307 includes a curved or arched front end and extends out from approximately a lower half of chassis 101.

Bosses 303 are formed on side wall 308 and engage with similar shaped mating recesses or clips formed in the back end of computer module 1400. Bosses 303 are alternatively referred to as couplers. Retention pin holes 301 are formed into opposite lateral sides of shelf 304 and receive retention pins 1600 (FIG. 15) that extend down from the bottom surface of computer module 1400. Bosses 303 in combination with retention pin holes 301 laterally align computer model 1400 with chassis 101.

A profile of computer module 1400 substantially conforms with a profile of shelf 304. Therefore, a front end of computer module 1400 is substantially flush with a front end of base chassis 101, lateral sides of computer module 1400 are substantially flush with lateral sides of base chassis 101, and a top side of computer module 1400 is substantially flush with a top side of base chassis 101 when computer module 1400 is seated into shelf 304 as shown in FIG. 1.

Figure 5:
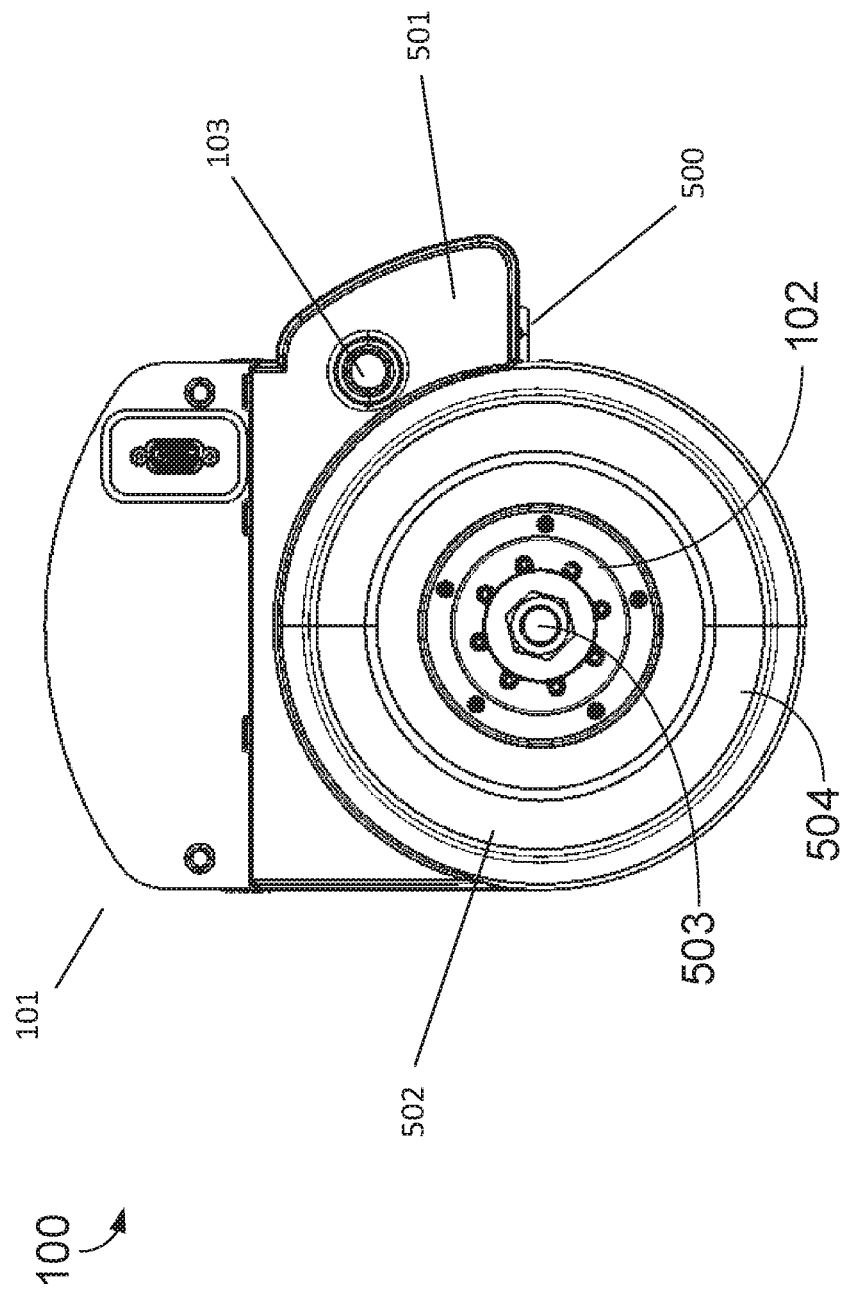
FIG. 5 shows an integrated power switch, external power and data connector, and internal motor extending from the chassis.

Latches 302 may be located on one or both lateral sides of shelf 304 and positively lock onto retention pins 1600 when computer module 1400 is seated into shelf 304. As computer module 1400 seats into shelf 304, an upper mating connector 1500 (FIG. 15) extending down from the lower side of computer module 1400 attaches to a lower multi-pin connector 305 that extends up from floor 307. After fully seated into shelf 304, computer module 1400 can then communicate with electrical and electro-mechanical components in base chassis 101 via connectors 305 and 1500. Connector 305 carries signals that enable computer module 1400 to communicate with base chassis 101 and to the rest of the vehicle through another external connector 500 (FIG. 5). For example, computer module 1400 may send steering commands to a motor that rotates mechanical interface 102 that rotates an attached steering wheel for steering a vehicle along a desired path.

Connector 305 is protected from water ingress by a rubber gasket 306 and opposing boss 1504 extending down from the lower surface of computer module 1400. For example, rubber gasket or boss 1504 extends around upper connector 1500. A second rubber gasket may be seated in a channel that extends around lower connector 305. A clamping force is applied between seal 306 and boss 1504 when computer module 1400 is locked into shelf 304. The compressed engagement of seal 306 and boss 1504 prevent water from penetrating into attached connectors 1500 and 305.

Figure 4A:
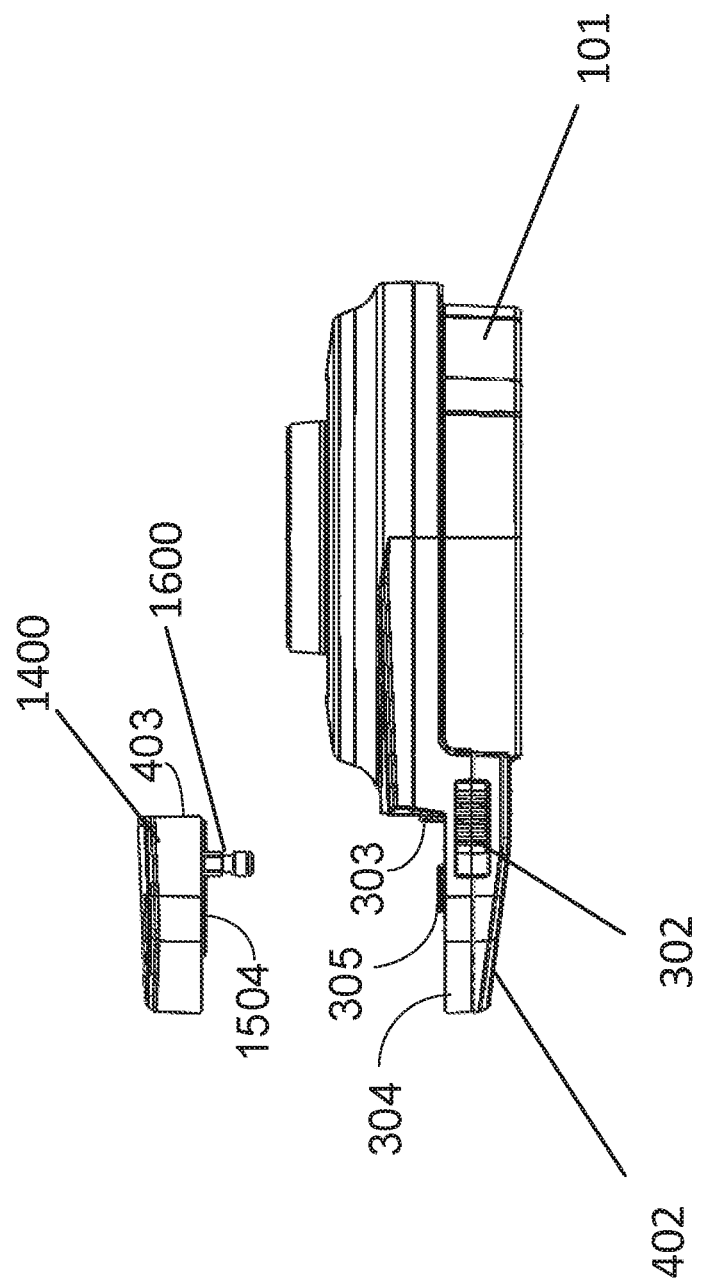
FIG. 4A shows a notional coupling of the chassis to the guidance computer module.

FIG. 4A shows a side view of base chassis 101 and the removable computer module 1400. In this view, retention pin 1600 is shown in relation to the base chassis 101 and the body of computer module 1400. A cover plate 402 may extend along the underside of shelf 304 to protect cables and water seal features.

Retention pins 1600 insert vertically down into pin holes 301 shown in FIG. 3. At the same time, clips or recesses formed in the back end 403 of computer module 1400 slide over and attach to bosses 303. Boss or rubber gasket 1504 surrounding connector 1500 seats down into the channel that retains the rubber gasket 306 that surrounds connector 305. Locking assemblies connected to latches 302 lock onto retention pins 1600 an hold computer module 1400 into shelf 304 of base chassis 101.

FIG. 4B shows integrated guidance system 100 attached to a steering column 404 and a steering wheel 405. As shown above in FIG. 1, a mechanical interface 102 extends through the center of base chassis 101 and includes a spline on a bottom end that attaches to a steering shaft 406 that extends through steering column 404. Steering shaft 406 is connected to a steering assembly that steers the wheels of a vehicle. The top end of mechanical interface 102 attaches to steering wheel 405. A motor located in base chassis 101 rotates mechanical interface 102 to rotate steering wheel 405 and steering shaft 406.

FIG. 5 shows a top view of base chassis 101 with power switch 103 and an external power and data connector 500 extending out of a protrusion 501 that extends out from the lateral side of base chassis 101. Protrusion 501 retains power switch 103 and external connector 500 outside of a swept volume 502 in base chassis 101 that retains the motor. By moving system power switch 103 and connector 500 outside of swept volume of 502, removable computer module 1400 can be brought closer to the center line 503 of mechanical interface 504 which reduces the intrusion of guidance system 100 into the seating area of the vehicle occupied by an operator.

Figure 6A:
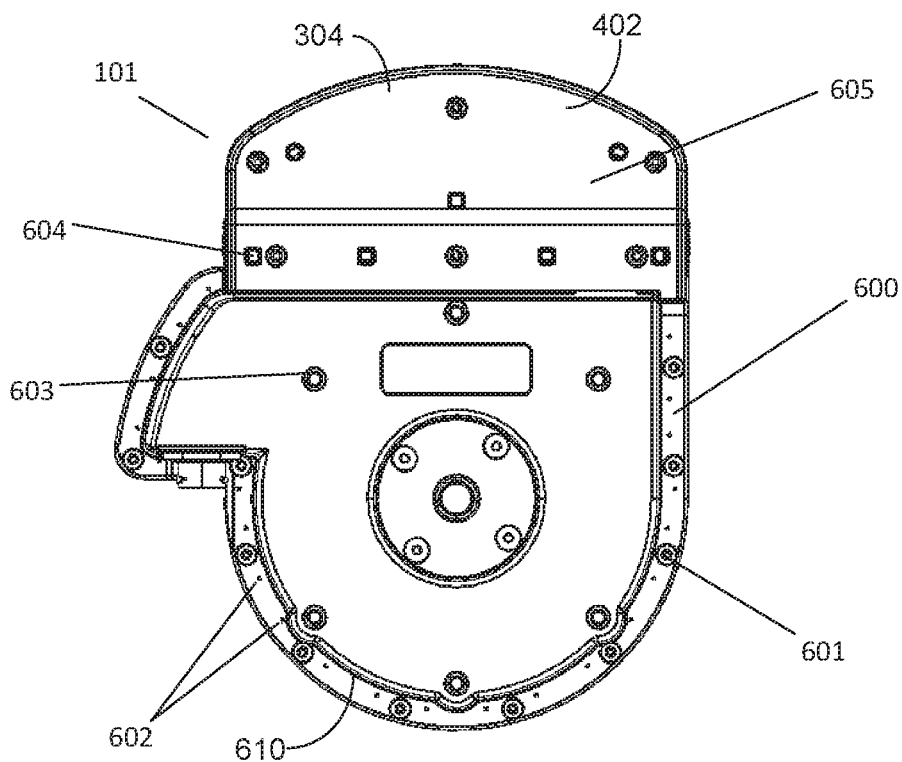
FIGS. 6A and 6B show features on the bottom of the chassis which include a water seal boundary, water drainage features of the seal, and locking apparatus.
Figure 6B:
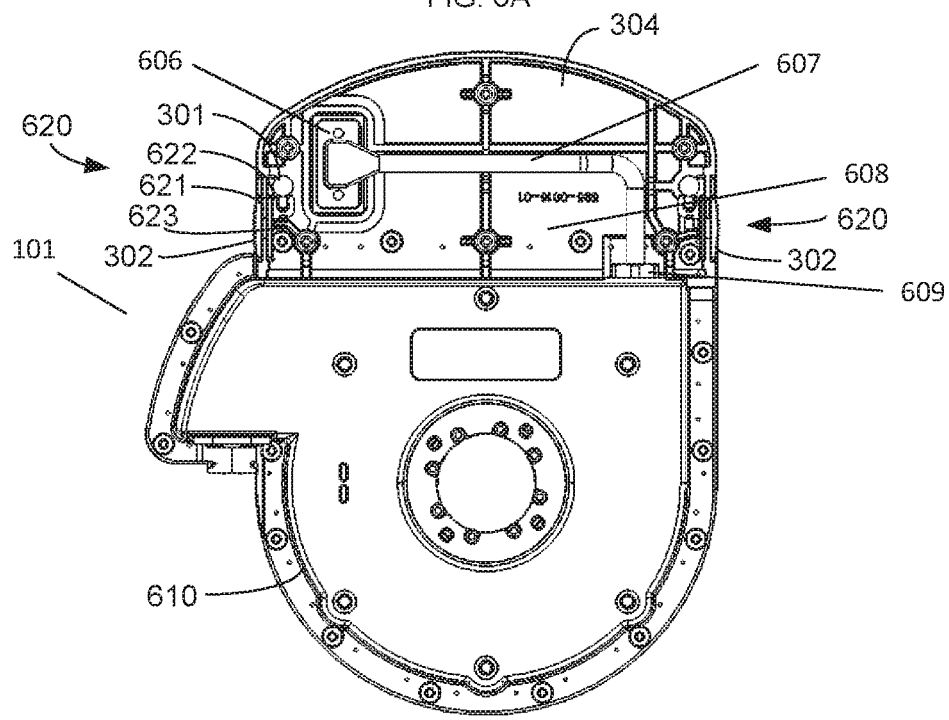

FIGS. 6A and 6B show bottom views of base chassis 101. FIG. 6A shows a bottom view of base chassis 101 with a cover 605 and FIG. 6B shows a bottom view of base chassis 101 with cover 605 removed. To prevent the intrusion of water and contaminates into base chassis 101, a seal track 600 incorporated into mated parts extends around the perimeter of chassis 101 forming a seal boundary 610. Seal track 600 may comprise a configuration well known in the state of the art. For example, seal track 600 may include a rubber gasket 610 that extends down and presses against a bottom cover. Clamping force on gasket 610 is provided by a number of fasteners, shown as bolts 601. In this example, seal track 600 follows the perimeter of base chassis 101 except in the front end where it extends behind the back end of shelf 304.

Bolts 601 are located in a perimeter volume outside of the water seal boundary formed by gasket 610. The volume outside of water seal boundary 610 can drain any accumulated water through drainage egress holes 602 located throughout the volume. Drainage egress holes 604 are formed in cover plate 402 to clear the space underneath shelf 304. A volume 608 under cover 605 is outside water seal boundary 610.

A bottom end 606 of connector 305 is shown inside of volume 608. Connector 606 is water-proof and is incorporated into a water-proof cable harness 607. Cable harness 607 is routed through volume 608 and passes through water-proof connector 609 to pass through a wall of base chassis 101 and into the water sealed internal volume of chassis 101.

FIG. 6B also shows a locking mechanism 620 located in base chassis 101 that locks computer module 1400 into shelf 304. A similar locking mechanism 620 is located in the opposite lateral side of base chassis 101. Locking mechanism 620 includes an arm 621 attached at one end to a back side of latch 302 and attached at an opposite end to a claw 622. Claw 622 includes a channel configured to seat around a retaining notch 1604 formed on retention pin 1600 shown in more detail in FIGS. 16A and 16B. A spring 623 is located between a back end of claw 622 and a stop formed in base chassis 101. Spring 623 is shown in a compressed state with latch 302 shown in a retracted unlocked position.

Figure 16A:
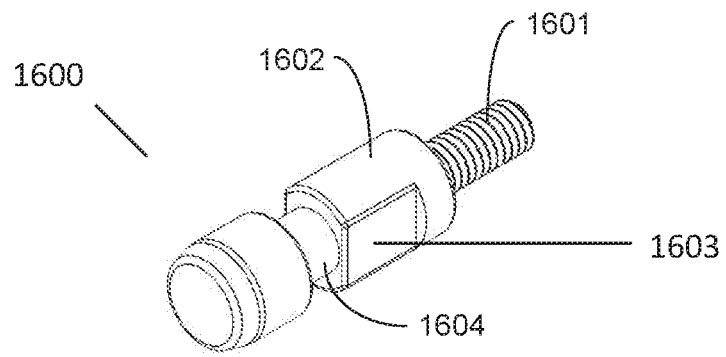
FIGS. 16A and B show, in perspective view and side view, respectively, details of a retention pin that provides alignment and retention of the guidance computer module to the base chassis.
Figure 16B:
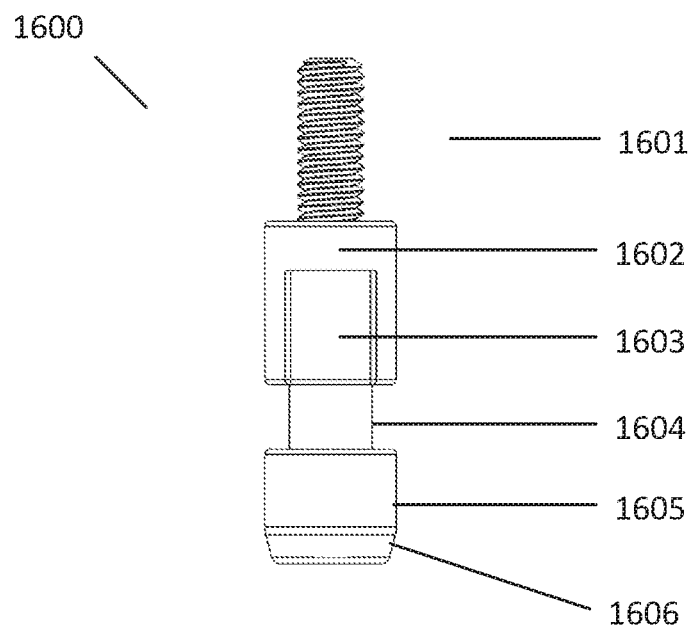

Computer module 1400 is seated into shelf 304. Retention pin 1600 inserts down into retention pin hole 301. A front head 1605 of retention pin 1600 pushes claw 622 backwards and compressing spring 623 as shown in FIG. 6B. As retention pin 1600 inserts further into pin hole 301, spring 623 pushes claw 622 forward around opposite sides of a retaining notch 1604 (FIGS. 16A and 16B). Attached latch 302 also moves forward. Front head 1605 of retention pin 1600 has a larger diameter than retaining notch 1604 and the channel in claw 622. Accordingly, front head 1605 is held underneath claw 622 locking retention pin 1600 and attached computer module 1400 into shelf 304.

To remove locked computer module 1400, latch 302 is slid backwards moving claw 622 backwards and compressing spring 623. Claw 622 moves out of retaining notch 1604 and back away from front head 1605 unlocking retention pin 1600 from locking mechanism 620. Latches 302 on both lateral sides of base chassis 101 are slid backwards unlocking both retention pins 1600 so computer module 1400 can be lifted up and out of shelf 304 in base chassis 101.

Figure 7:
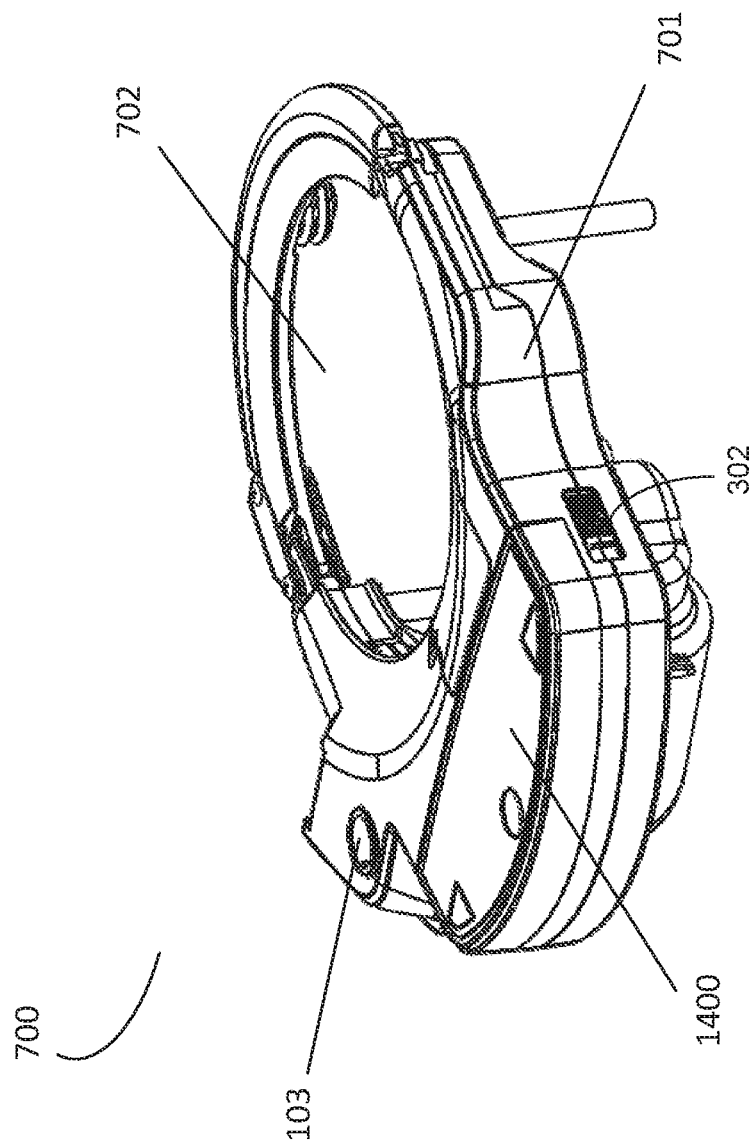
FIG. 7 shows hardware on a second integrated tractor guidance and steering system including an alternative electro-mechanical actuator, the same guidance computer, and interfaces to the vehicle.

FIG. 7 shows a second integrated steering and guidance system 700 that includes a base chassis 701 with features similar with base chassis 101 for engaging with removable computer module 1400. For example, base chassis 701 includes a similar power switch 103 and latches 302. In this example, the mechanical interface to the steering column 404 is located in a volume 702 and uses a gear driven configuration known in the state of the art.

Figure 8:
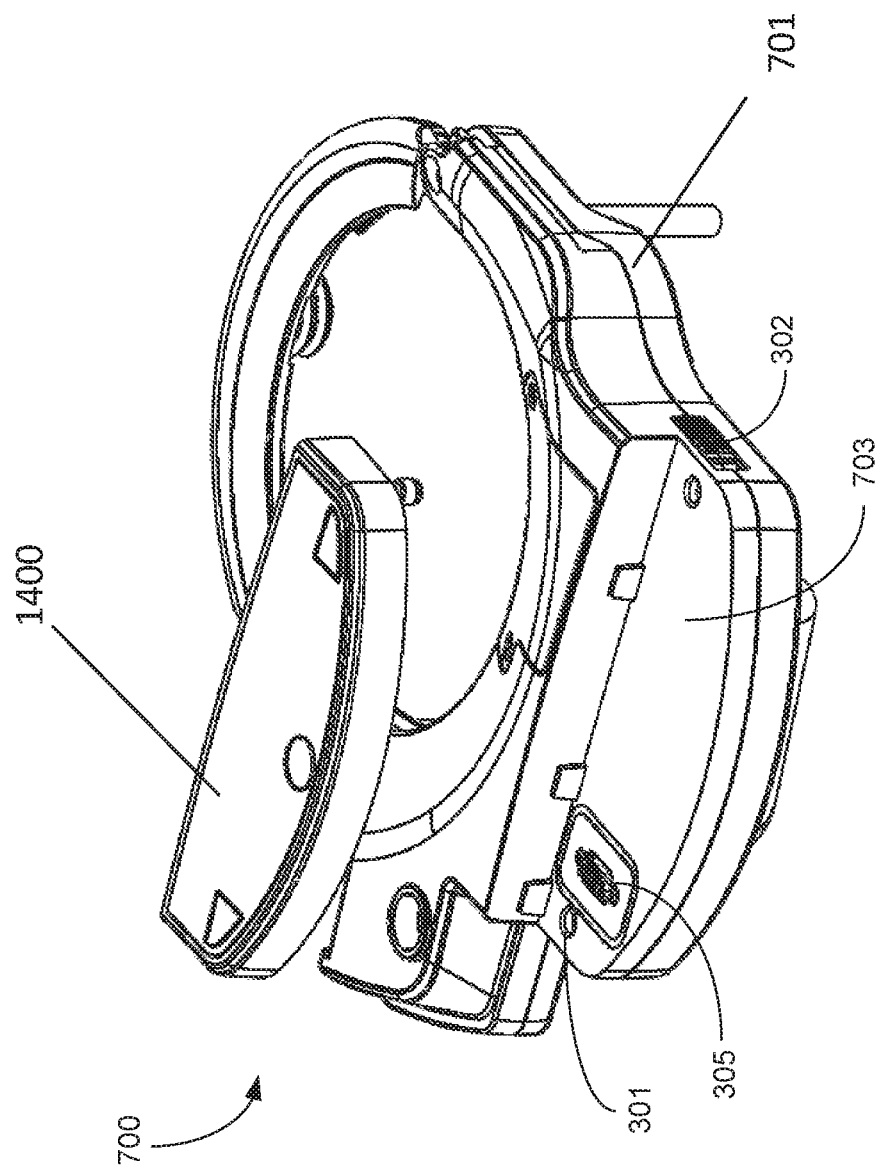
FIG. 8 shows the configuration of a second chassis design with the same guidance computer of FIG. 1.

FIG. 8 shows computer module 1400 detached from base chassis 701. Base chassis 701 also includes a pocket or shelf 703 similar to shelf 304 formed in base chassis 101. Shelf 703 includes a similar lower connector 305 and retention pin holes 301.

Figure 9:
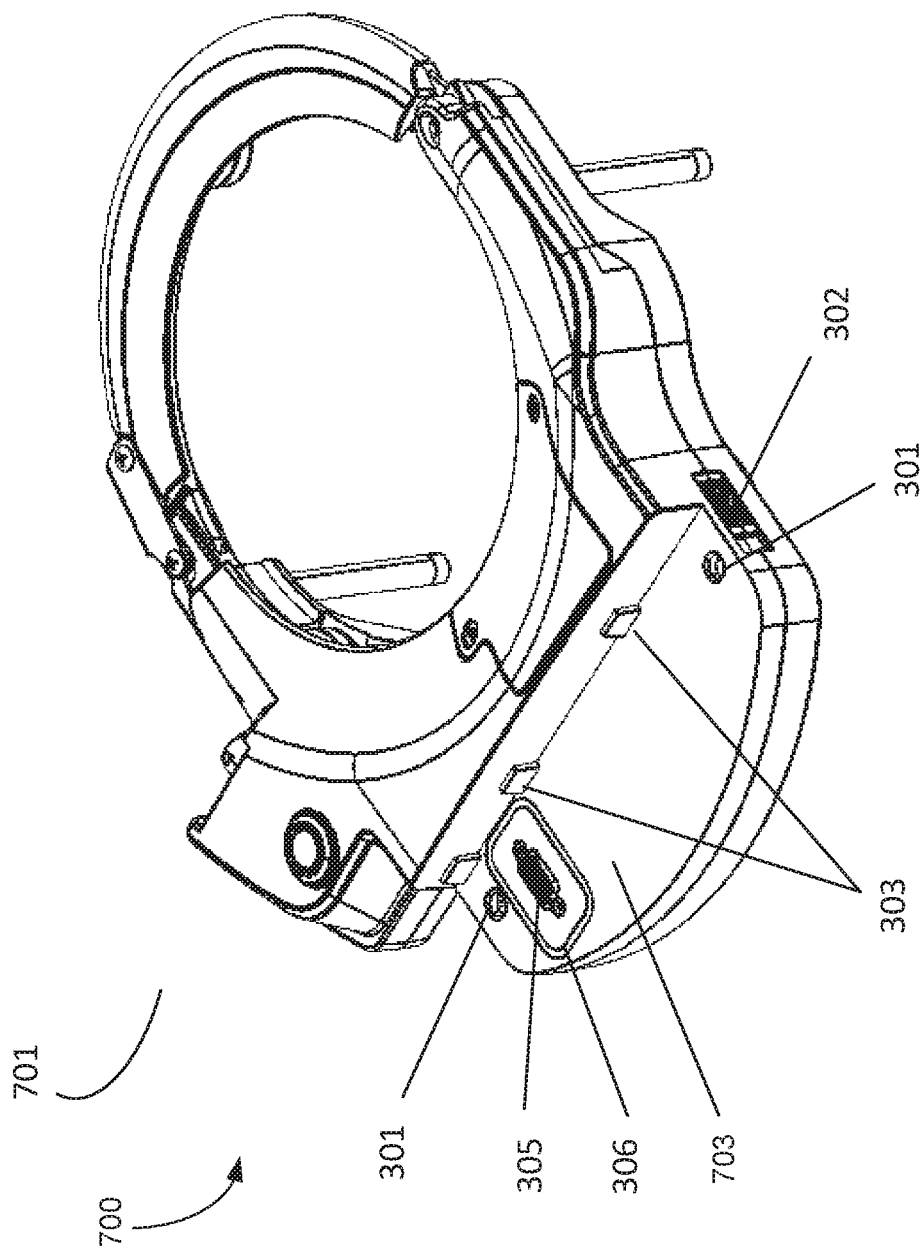
FIG. 9 shows the second integrated chassis design with the same interface features used for interoperating with a guidance computer module.

FIG. 9 shows in more detail the common interface elements on base chassis 701 used for connecting to computer module 1400. The interface elements include retention holes 301, latches 302, locating bosses 303, and lower mating connector 305 within shelf 703. Connector 305 is again protected from water ingress by seal 306 and opposing seal boss 1504 extending down from the bottom of computer module 1400. Seal 306 and boss 1504 are pressed together by the clamping force imparted on computer module 1400 when latched into shelf 703.

Figure 10:
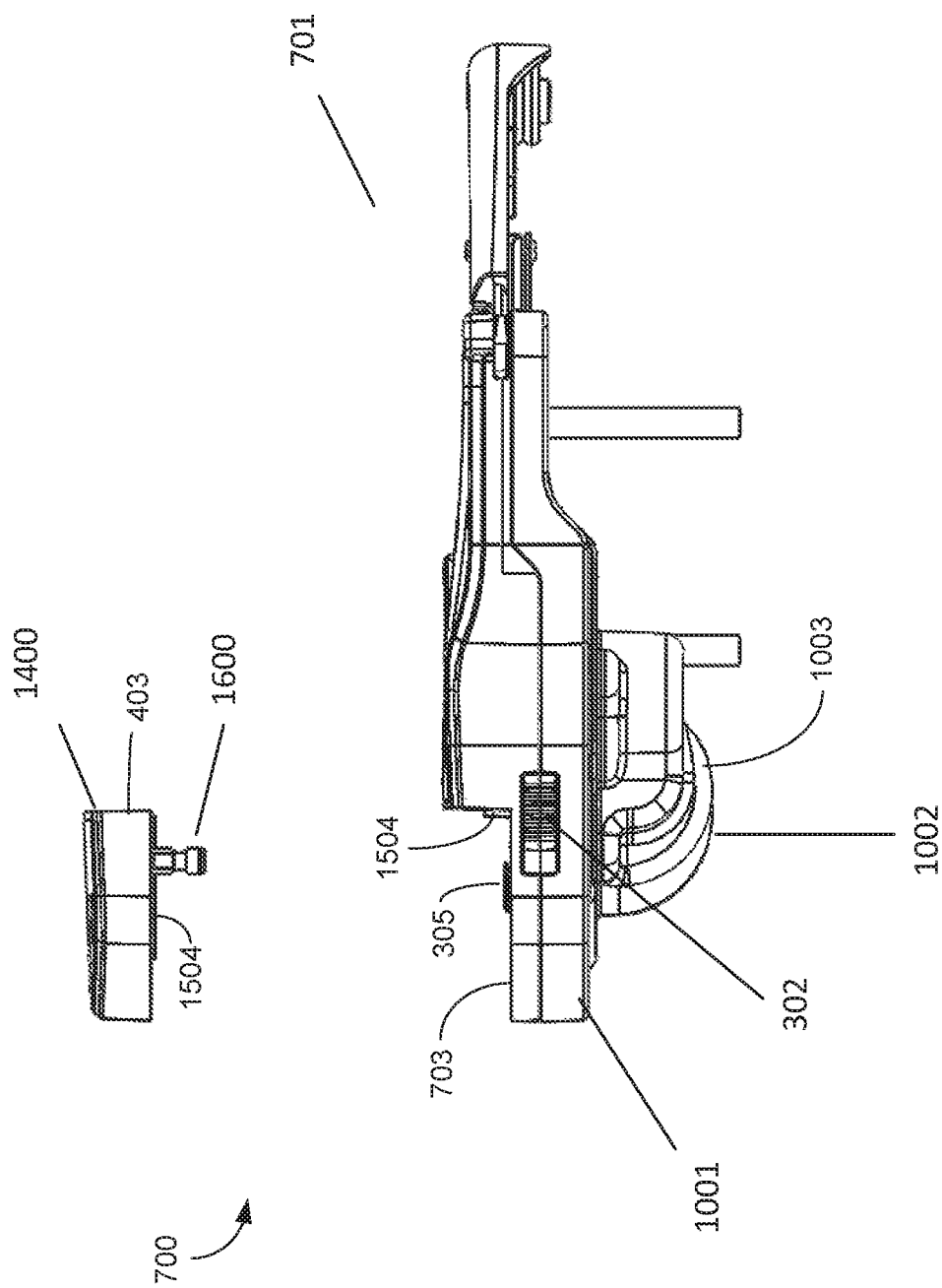
FIG. 10 shows a notional coupling of the second integrated chassis to the guidance computer module as well as the location of the actuator motor.

FIG. 10 shows a side view of guidance system 700 including base chassis 701 and removable computer module 1400. Boss 1504 and retention pin 1600 extend down from the lower surface of computer module 1400. Computer module 1400 inserts down onto shelf 703 and recesses formed in the back end 403 of computer module 1400 attach over bosses 1504. Retention pins 1600 insert into pin holes 301 formed in shelf 703 and lock into locking mechanisms 620 attached to latches 302.

Base chassis 701 incorporates an alternative structure where underside 1001 of shelf 703 is located inside a water seal boundary. A motor 1003 contained in base chassis 701 is also located inside of a water resistant volume 1002. Locating motor 1003 under the mechanical interface to the gear train and underneath the removable computer module 1400 further limits intrusion of guidance system 700 into the area of the vehicle where the operator sits.

Figure 11:
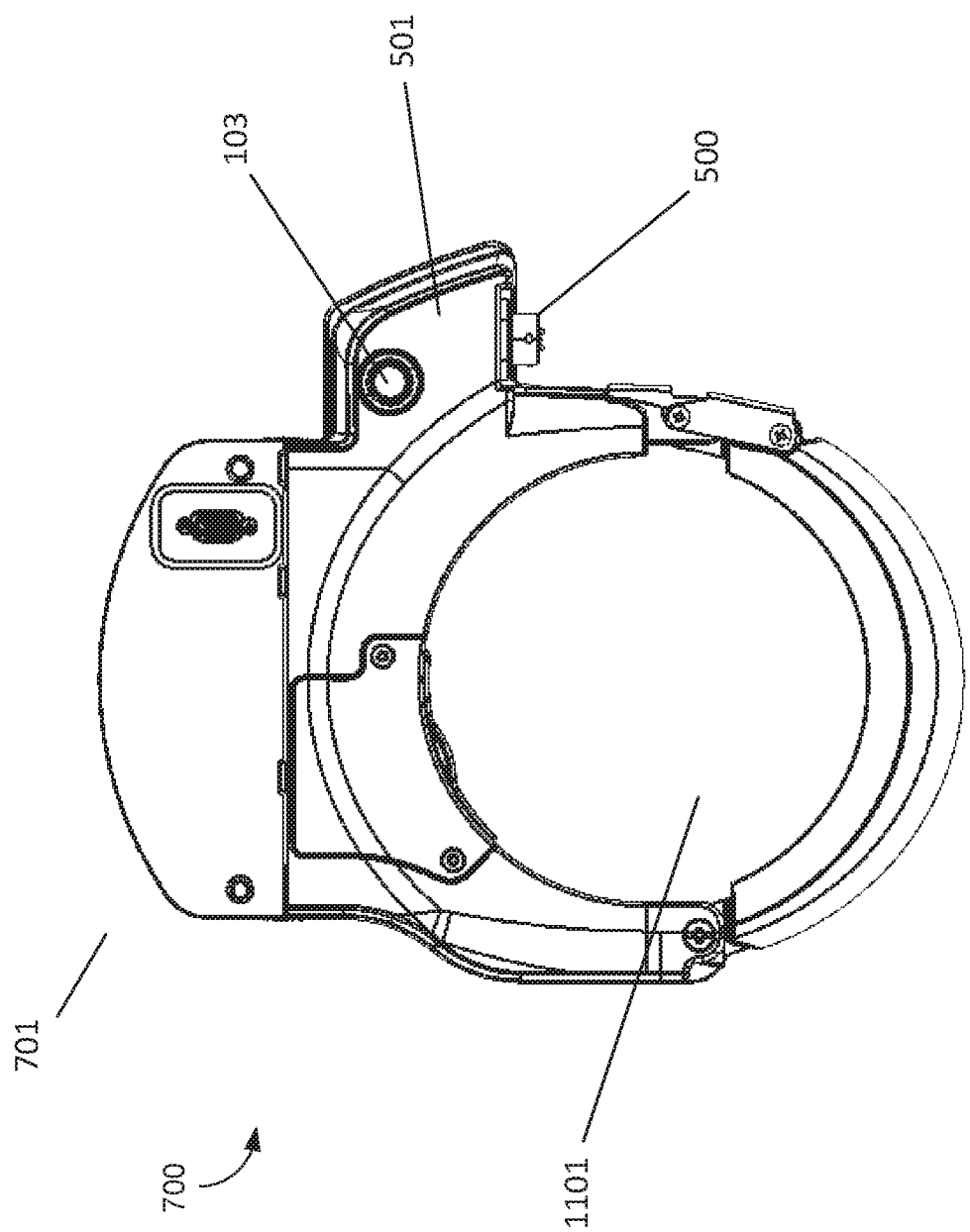
FIG. 11 shows features of the top of the second chassis design which highlight the integrated power switch, external power and data connector, and a location of the steering interface.

FIG. 11 shows a top view of second base chassis 701 including elements similar to those used in base chassis 101 including a protruding volume 501 that contains power switch 103 and external connector 500. Base chassis 701 includes a volume 1101 that contains a gear train mechanism that applies actuation torque to a steering column. The gear train is known in the state of the art and therefore not described in further detail.

FIG. 12 is a bottom view of base chassis 701. A seal track 600 is clamped around the perimeter of chassis 701 with twelve bolts 601. Seal track 600 may include a rubber gasket that extends downward forming a water seal boundary 610. An array of drainage holes 602 extend throughout track 600 and drain like base chassis 101 in FIGS. 6A and 6B. Several threaded holes 603 are used for attaching mounting brackets to base chassis 101.

Figure 13A:
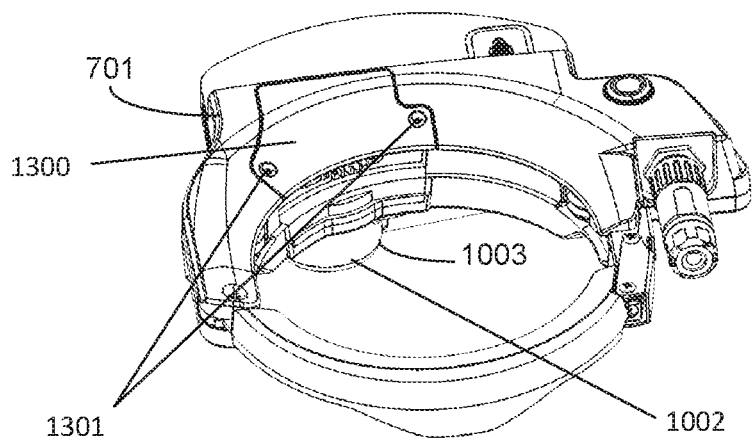
FIGS. 13A, 13B, and 13C show in several perspective views the details of the motor output shaft extending through the water seal boundary, the mechanical gear configuration, and the cover for the seal and gear.
Figure 13B:
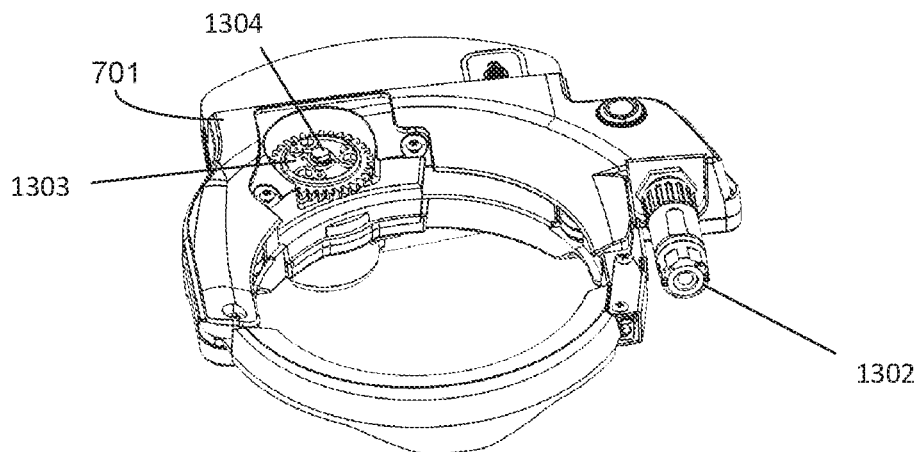
Figure 13C:
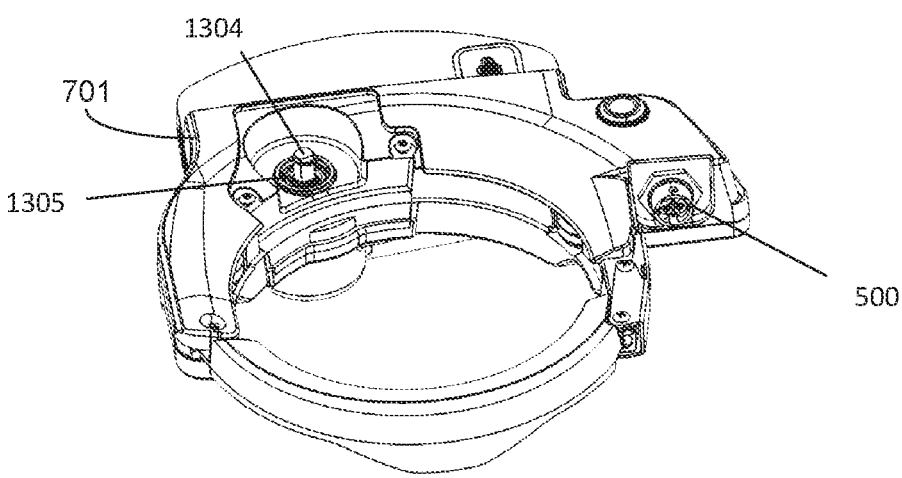

FIGS. 13A, 13B, and 13C show perspective views of base chassis 701. A drive gear 1303 interfaces with a mechanical interface (not shown) attached to steering column 404. A mating gear. One example mounting interface is shown in U.S. Pat. No. 10,384,709 which has been incorporated by reference in its entirety.

Drive gear 1303 is driven by a motor shaft 1304 attached to motor 1003 contained in a sealed enclosure 1002. The vehicle operator is protected from drive gear 1303 by a cover plate 1300 which is attached to base chassis 701 by bolts 1301 located outside of water seal boundary 610. Motor shaft 1304 egresses from the water seal volume formed by water seal boundary 610 through a dedicated shaft seal 1305 seated into base chassis 701 using parts and techniques known in the state of the art. External power and data connector 500 is shown in FIGS. 13A and 13B connected to a mating connector body 1302.

Figure 14A:
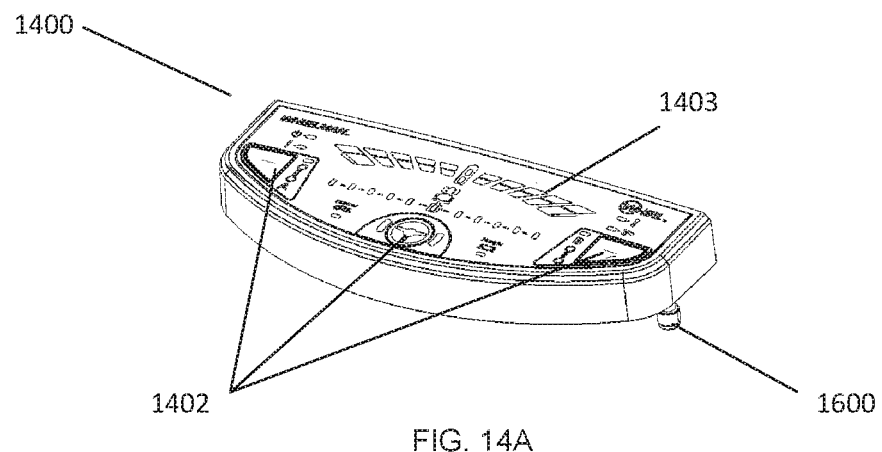
FIGS. 14A and 14B show the modular guidance computer with a first user interface configuration including buttons and LEDs and an optional second configuration without the user interface.
Figure 14B:
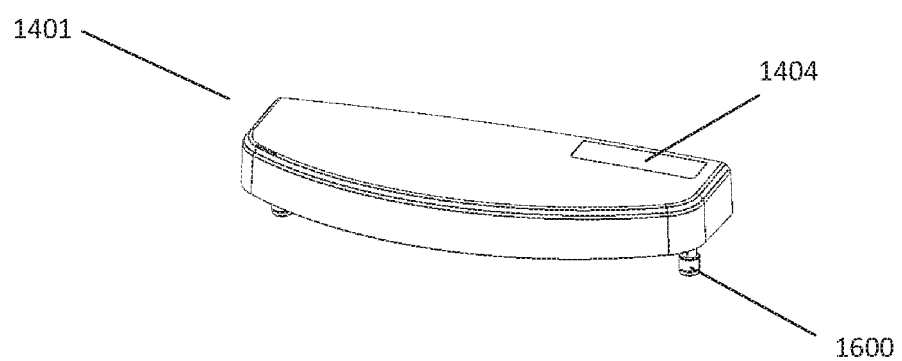

FIGS. 14A and 14B show two variations of removable guidance computer modules 1400 and 1401, respectively. Computer modules 1400 and 1401 share interface components and are mechanically interchangeable and electrically interoperable with base chassis 101 and 701. For example, computer modules 1400 and 1401 each include the same retention pins 1600 that insert into the same retention pin holes 301 shown in FIGS. 3 and 8.

Removable module 1400 includes user interface elements such as buttons 1402, indication lights 1403, and branding using different colors and logos. Removable module 1401 does not include a user interface but may include branding colors or logos 1404. Contents of removable modules 1400 and 1401 may vary without regard to the use of user interface features and branding.

Figure 15:
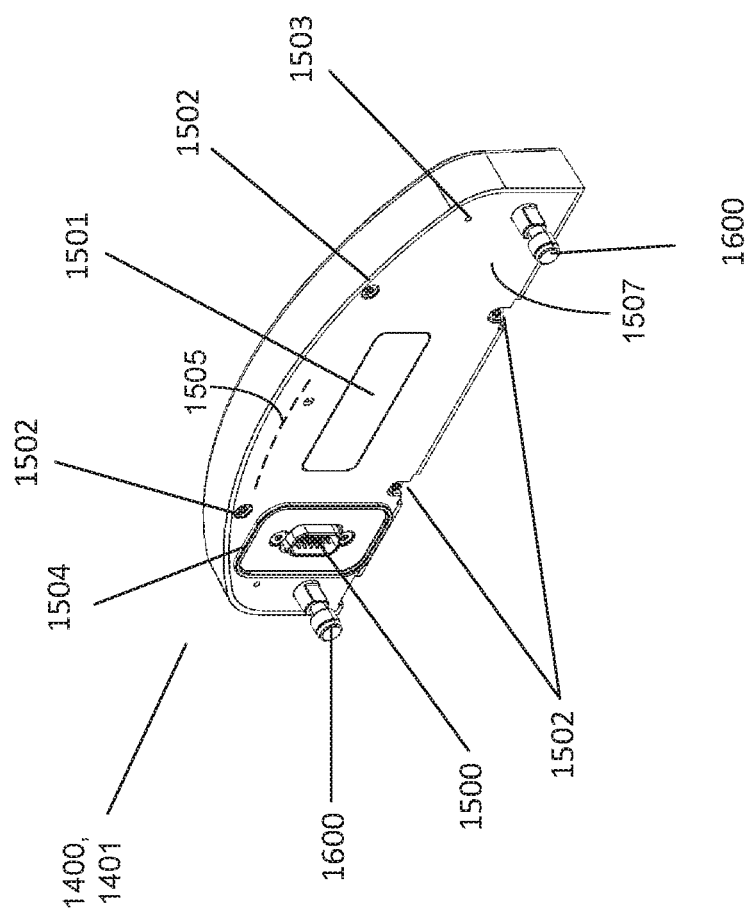
FIG. 15 shows a bottom of the modular guidance computer that can be attached to a base chassis with various mechanical configurations.

FIG. 15 is a bottom view of removable computer module 1400 or 1401. Features located on the bottom of computer modules 1400 and 1401 interface with corresponding features located on shelves 304 or 703 formed on the front ends of base chassis 101 and 701 in FIGS. 3 and 8, respectively. For illustration purposes, only computer module 1400 and base chassis 101 are described below.

Computing devices in computer module 1400 exchange electrical signals with electrical elements in base chassis 101 though connector 1500 that interconnects with connector 305 that extends up from shelf 304. Connector 1500 is protected from water ingress when mated to base chassis 101 by seal ring boss 1504 and seal 306 which clamp together into a sealed state when computer module 1400 is locked in place via retention pins 1600 and latch 302 into shelf 304.

A water seal boundary extends around an internal periphery of computer module 1400 and is represented by dashed line 1505. For example, an upper enclosure for computer module 1400 may include a seal track 600 similar to that described above for base chassis 101. A gasket extending down from the seal track 600 may compress against bottom plate 1507 when attached to the upper enclosure with bolts 1502 forming water seal boundary 1505. An unsealed volume outside of seal boundary 1505 is cleared of water through drainage holes 1503. Removable modules 1400 and 1401 can be marked with branding and identification information on the bottom of the module as illustrated by optional label 1501.

FIG. 16A is a perspective view and FIG. 16B is a side view of retention pin 1600 used to retain computer modules 1400 and 1401 to base chassis 101 and 701. Retention pin 1600 includes a body 1602 with a threaded shaft 1601 to fasten pin 1600 to the enclosure body of computer module 1400 or 1401. A pair of flat areas 1603 are cut or formed into body 1602 to receive a wrench for screwing threaded shaft 1601 into the enclosures of computer module 1400 or 1401.

A retaining notch 1604 is cut or formed into pin body 1602 and engages with locking mechanism 620 in base chassis 101 or 701 operated by retaining latch 302 as shown in FIG. 6B. Locking mechanism 620 attaches around retaining notch 1604 positively retaining pin 1600 and attached computer module 1400 or 1401 into shelf 304 of base chassis 101 or shelf 703 in base chassis 701. A head 1605 is formed on the end of pin 1600 and includes a tapered end 1606 that inserts into pin hole 301 and moves back locking mechanism 620. As retention pin 1600 moves further into pin hole 301, a spring moves locking mechanism 620 around retaining notch 1604 locking retention pin 1600 into base chassis 101 or 701. Latch 302 is slid backwards to move locking mechanism 620 out of retaining notch 1604 so retention pin 1600 can be lifted out of pin hole 301 and computer module 1400 removed from base chassis 101 or 701.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. An integrated steering and guidance system for steering a vehicle, the integrated steering and guidance system comprising: a base chassis configured to attach to a steering column and a steering wheel, the base chassis containing a motor and drive gear configured to steer the vehicle by turning the steering wheel or turning a steering shaft in the steering column; a computer module including an enclosure detachably connected to the base chassis, the computer module retaining a computing device detachably connected to the motor in the base chassis and configured to send steering commands to the motor to automatically steer the vehicle; and a shelf formed in the base chassis configured to retain the computer module, wherein the shelf is formed in a front end of the base chassis and has a profile that substantially conforms with a profile of the computer module.

2. The integrated steering and guidance system of claim 1, wherein the shelf includes: a wall extending vertically down from a top surface of the base chassis; and a floor extending horizontally out from the wall to a front end of the base chassis.

3. The integrated steering and guidance system of claim 2, including one or more couplers extending out from the wall configured to attach to a back end of the computer module.

4. The integrated steering and guidance system of claim 2, including one or more retention pins extending down from a bottom side of the computer module, the retention pins configured to insert into retention pin holes formed in the floor of the shelf.

5. The integrated steering and guidance system of claim 4, including: a locking mechanism located inside of the base chassis configured to lock onto the retention pins; and a latch attached to the locking mechanism configured to unlock the locking mechanism from the retention pins.

6. The integrated steering and guidance system of claim 1, including: an upper power and data connector extending down from a bottom surface of the computer module; and a lower power and data connector extending up from the shelf configured to attach to the upper power and data connector when the computer module is seated into the shelf.

7. The integrated steering and guidance system of claim 6, including: a gasket extending around one or more of the upper and lower power and data connectors configured to provide a seal around the upper and lower power and data connectors when the computer module is seated in the shelf.

8. The integrated steering and guidance system of claim 1, including: a protuberance extending out a lateral side of the base chassis; and one or more of a power switch and a power and data connector located on the protuberance.

9. The integrated steering and guidance system of claim 8, wherein the power switch extends up from a top exterior surface of the protuberance; and the power and data connector extends out of a back wall of the protuberance.

10. The integrated steering and guidance system of claim 1, including a user interface located on a top surface of the computer module, the user interface including one or more buttons configured to communicate with the computing device and control operation of the motor in the base chassis.

11. The integrated steering and guidance system of claim 1, including a seal track extending around a perimeter of the base chassis, the seal track including an outside perimeter volume and an inner gasket configured to press against a bottom cover of the base chassis.

12. An apparatus for controlling a steering wheel, the apparatus comprising: an enclosure configured to attach to a steering wheel column; a drive mechanism located in the enclosure; a motor located in the enclosure and coupled to the drive mechanism; a control module detachably seating into a docking platform formed in the enclosure, the control module configured to electrically connect to the motor when seated in the docking platform and send steering commands to the motor for turning the steering wheel; and wherein a front side of the control module is substantially flush with a front side of the enclosure and lateral sides of the control module are substantially flush with lateral sides of the enclosure when the control module is seated in the docking platform.

13. The apparatus of claim 12, wherein a top side of the control module is substantially flush with a top side of the enclosure when the control module is seated in the docking platform.

14. The apparatus of claim 12, wherein the docking platform includes a wall that extends vertically down from a top surface of the enclosure and a floor that extend horizontally out from a bottom end of the wall to a front end of the enclosure.

15. The apparatus of claim 12, including an upper connector extending down from a bottom side of the control module and a lower connector extending up from the docking platform, wherein the upper connector is configured to attach to the lower connector when the control module is seated into the docking platform.

16. The apparatus of claim 12, further comprising: a locking mechanism located in the enclosure configured to detachably lock the control module into the docking platform.

17. The apparatus of claim 16, including a latch coupled to the locking mechanism and located on an exterior surface of the enclosure, the latch configured to unlock the locking mechanism from the control module.

* * * * *